United States Patent
Moore

(10) Patent No.: US 8,342,305 B2
(45) Date of Patent: Jan. 1, 2013

(54) OIL GUIDING DEVICE FOR HYDRAULIC BRAKE LEVER ASSEMBLY HAVING A BRAKE LEVER

(75) Inventor: Wayne-Ian Moore, Changhua County (TW)

(73) Assignee: Ashima Ltd., Changhua County (TW)

( * ) Notice: Subject to any disclaimer, the term of this patent is extended or adjusted under 35 U.S.C. 154(b) by 392 days.

(21) Appl. No.: 12/861,843

(22) Filed: Aug. 24, 2010

(65) Prior Publication Data

US 2012/0048667 A1    Mar. 1, 2012

(51) Int. Cl.
*B60T 11/00* (2006.01)
(52) U.S. Cl. .................................... 188/344; 188/24.22
(58) Field of Classification Search .................. 188/344, 188/24.22, 2 D, 151 R, 352, 353, 357, 358, 188/359, 360, 196 A; 60/584, 585, 592
See application file for complete search history.

(56) References Cited

U.S. PATENT DOCUMENTS 6,804,961 B2 * 10/2004 Lumpkin ..................... 60/588
7,497,309 B2 * 3/2009 Chen ............................. 188/344

* cited by examiner

*Primary Examiner* — Xuan Lan Nguyen

(57) ABSTRACT

An oil guiding device for hydraulic brake lever assembly having a brake lever includes a seat connected to the brake lever. The seat has an oil reservoir disposed thereon. The oil reservoir has an oil chamber defined therein. An oil guiding base is disposed in the oil chamber. The oil guiding base has an oil inlet and an oil outlet defined therein. An oil guiding unit engages with the oil guiding base. The oil guiding unit has a pipe disposed thereon and an oil hole defined therein. The pipe and the oil hole are communicated with the oil outlet and the oil inlet respectively. A cover panel engages with the oil reservoir. The pipe sucks up the hydraulic oil gathered in the oil chamber and supplies the hydraulic oil through the oil outlet; the returned hydraulic oil flows into the oil chamber through the oil inlet.

2 Claims, 4 Drawing Sheets

OIL GUIDING DEVICE FOR HYDRAULIC BRAKE LEVER ASSEMBLY HAVING A BRAKE LEVER

BACKGROUND OF THE INVENTION

1. Field of the Invention

The present invention relates to a hydraulic brake lever assembly, and more particularly to an oil guiding device for hydraulic brake lever assembly having a brake lever for preventing formation of air bubbles in hydraulic oil during operation.

2. Description of Related Art

The braking system of a bicycle is the key component for controlling speed of the bicycle and maintaining the safety for riding. A conventional hydraulic brake assembly for bicycle rim brake includes an oil tank for containing oil, a brake lever pivotally connecting to one end of the oil tank, and a tube for connecting with a caliper body is engaged to another end of the oil tank. When the brake lever is exerted, the oil stored in the oil tank is pressured into to the tube, thereby forcing the caliper body to push toward a rim until the rim is forced to brake. The hydraulic brake assembly is widely applied on various types of bicycles for the outstanding braking effect it can achieve.

In the conventional hydraulic brake assembly, the oil tank includes a chamber and an oil storage unit respectively formed in two laterals thereof The chamber is adapted for receiving a piston assembly which is slidably movable therein. The oil storage unit is adapted for storing oil which is provided for braking. A first guiding hole and a second guiding hole are defined between the chamber and the oil storage unit such that the chamber and the oil storage unit are communicated for the oil to flow therein between. The first guiding hole and the second guiding hole have different diameters. Thereby when a rider exerts the brake lever, the piston assembly pressured the oil in the chamber to the caliper body through the tube, when the rider releases the brake lever, the oil in the oil storage unit passes through the first guiding hole to the chamber such that oil in the chamber is maintained in a sufficient level for braking and preventing malfunction due to insufficient oil.

However, despite the effect it provides, the conventional hydraulic brake assembly has the following drawbacks. Usually the brake lever is downwardly and inclinedly positioned relative to the bicycle handlebar for gripping purpose such that the oil tank is also downwardly and inclinedly positioned relative to the bicycle handlebar. When the oil tank is inclinedly positioned, the oil in the chamber would flow into the caliper body through the tube, causing excessive oil to accumulate in the caliper body. In addition, due a tilted position of the oil tank, air may enter into the hydraulic oil through first and second guiding holes causing formation of air bubbles in the hydraulic oil, which results in a "spongy brake" operation and would influence the performance of the hydraulic brake assembly as hydraulic pressure can no longer be distributed accurately and may consequently lead to serious injuries of the rider.

The present invention has arisen to obviate/mitigate the disadvantages of the conventional hydraulic brake assembly.

SUMMARY OF THE INVENTION

The main objective of the present invention is to provide an oil guiding device for a hydraulic brake lever assembly having a brake lever comprises a seat pivotally connected to the brake lever. The seat has an oil reservoir disposed thereon. The oil reservoir has an oil chamber defined therein which is adapted for storing hydraulic oil. An oil guiding base is disposed in a bottom of the oil chamber. The oil guiding base has an oil inlet and an oil outlet defined therein. An oil guiding unit is engaged with the oil guiding base. The oil guiding unit has a pipe disposed thereon and radially extending therethrough such that the pipe is oriented toward the brake lever. The oil guiding unit has an oil hole defined therein and located adjacent to the pipe. The pipe and the oil hole correspondingly and respectively communicated with the oil outlet and the oil inlet. A sealing pad is disposed on an outer periphery of the oil reservoir for covering the oil chamber. The cover panel secures the sealing pad with the oil reservoir such that the sealing pad is sandwiched between the oil reservoir and the cover panel for preventing leakage of hydraulic oil from the oil chamber.

When the seat is downwardly inclinedly positioned relative to a bicycle handlebar, the hydraulic oil contained in the oil chamber gathered in a lower end thereof which is proximate to the brake lever, the pipe oriented toward the brake lever sucks up the hydraulic oil gathered in the lower end of the oil chamber and directly supplies the hydraulic oil for braking through the oil outlet such that no air enters into the oil outlet during operation; the returned hydraulic oil flows into the oil chamber through the oil inlet and the oil hole; thereby smooth braking operation is maintained as air is prevented from entering into the hydraulic oil during operation.

The present invention will become more obvious from the following description when taken in connection with the accompanying drawings which show, for purposes of illustration only, a preferred embodiment in accordance with the present invention.

DETAILED DESCRIPTION OF THE INVENTION

Figure 1:
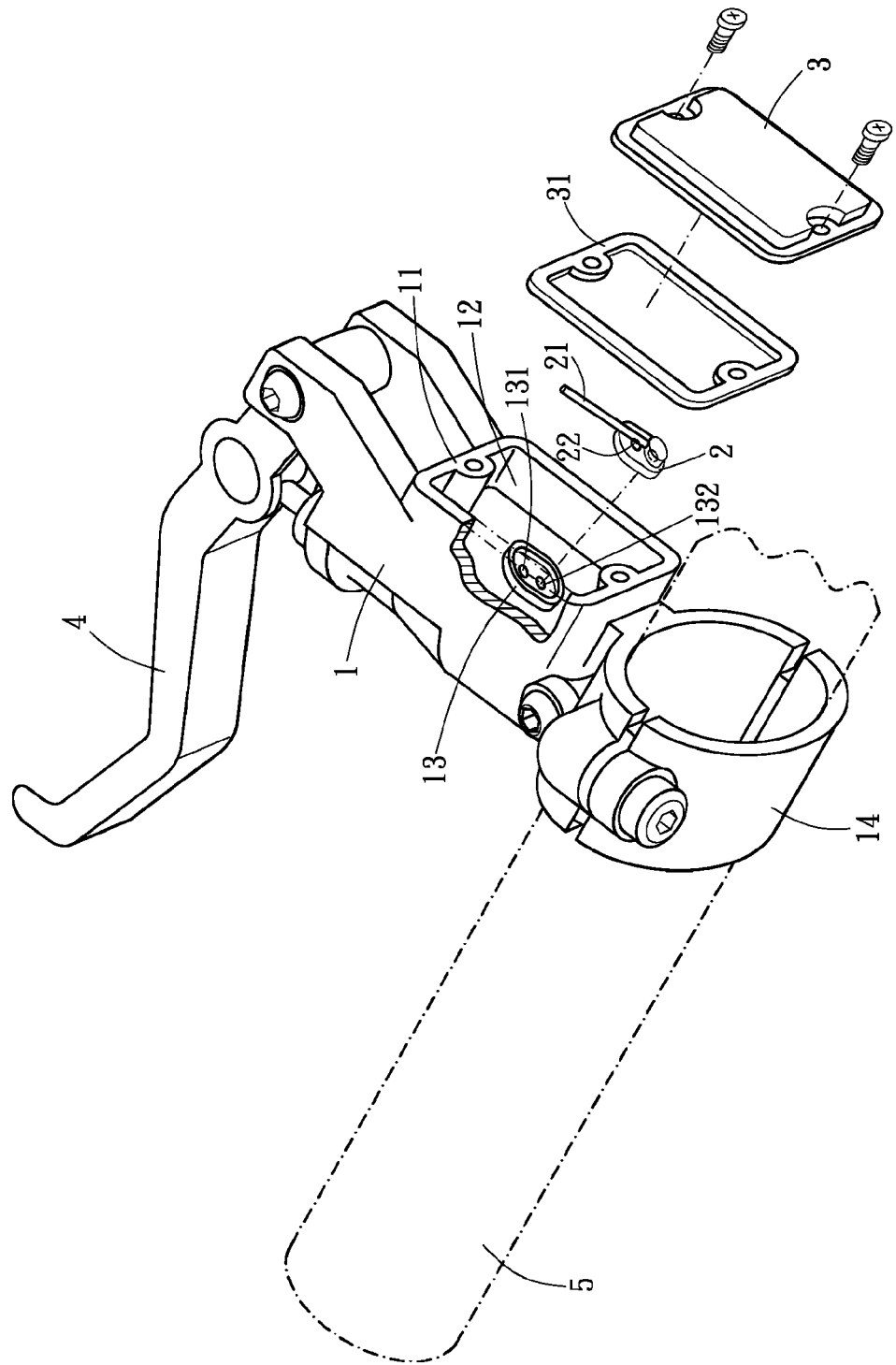
FIG. 1 is an exploded perspective view of an oil guiding device for hydraulic brake lever assembly having a brake lever in accordance with the present invention.
Figure 2:
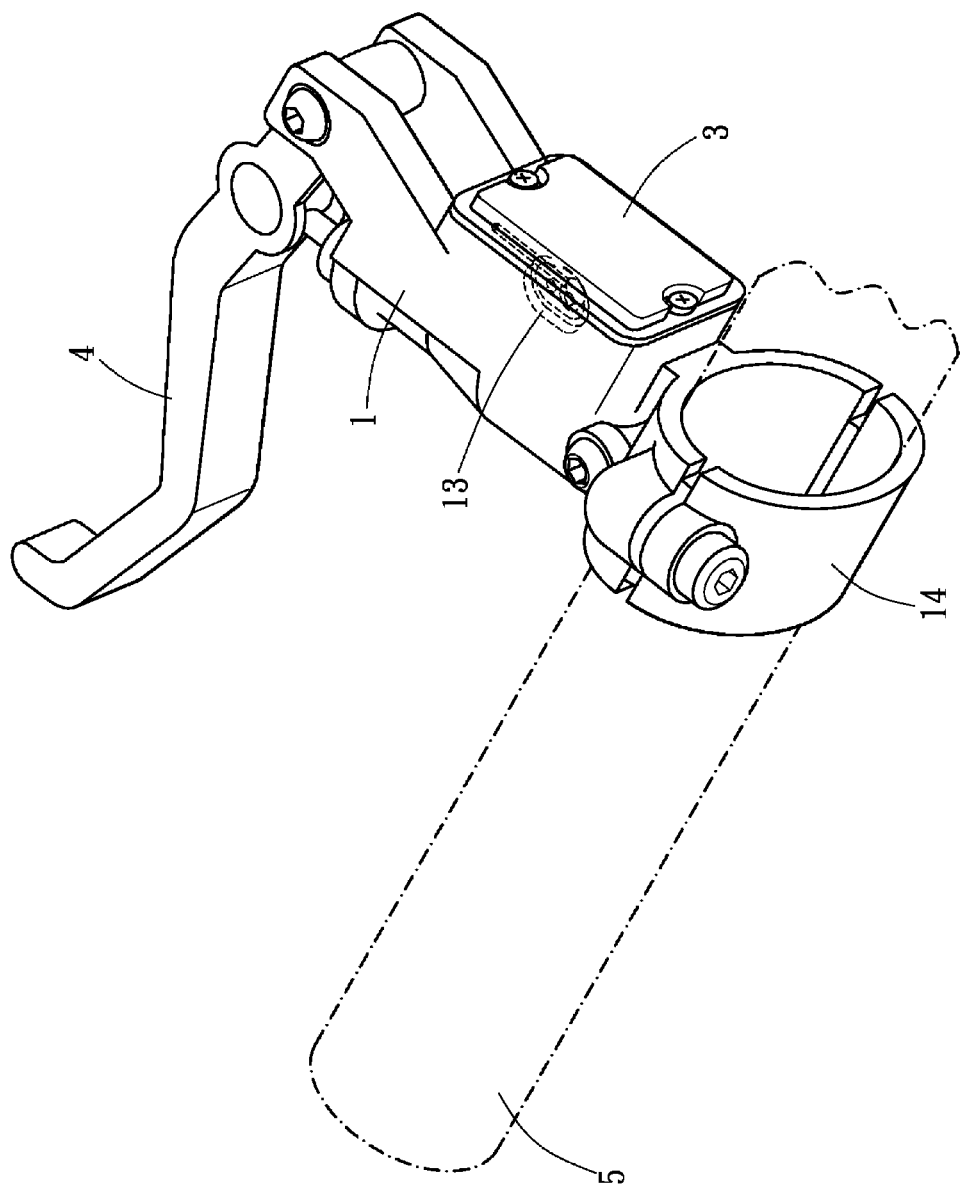
FIG. 2 is an assembled perspective view of the oil guiding device for hydraulic brake lever assembly having a brake lever in accordance with the present invention.

Referring to the drawings and initially to FIGS. 1-2, an oil guiding device for hydraulic brake lever assembly having a brake lever in accordance with the present invention comprises a seat 1 which has one end pivotally connected to the brake lever 4. Another end of the seat 1 has a connecting clamp 14 disposed thereon which is adapted for clampingly engaging with a bicycle handlebar 5. The seat 1 has an oil reservoir 11 disposed thereon. The oil reservoir 11 has an oil chamber 12 defined therein which is adapted for storing hydraulic oil. An oil guiding base 13 is protrudingly disposed in a bottom of the oil chamber 12. The oil guiding base 13 has an oil inlet 131 and an oil outlet 132 defined therein. An oil guiding unit 2 is correspondingly and embeddedly engaged with the oil guiding base 13 such that the oil inlet 131 and oil outlet 132 are covered by the oil guiding unit 2 and are not directly exposed to the oil chamber 12. The oil guiding unit 2 has a pipe 21 disposed thereon and radially extending therethrough such that a tip of the pipe 21 is oriented toward the brake lever 4 (as shown in FIG. 2). The oil guiding unit 2 has an oil hole 22 defined therein and located adjacent to the pipe 21. The pipe 21 and the oil hole 22 correspondingly and respectively communicated with the oil outlet 132 and the oil inlet 131. A sealing pad 31 is disposed on an outer periphery of the oil reservoir 11 for covering the oil chamber 12. A cover panel 3 threadedly secures the sealing pad 31 with the oil reservoir 11 such that the sealing pad 31 is sandwiched between the oil reservoir 11 and the cover panel 3 for effectively preventing leakage of hydraulic oil from the oil chamber 12.

Figure 3:
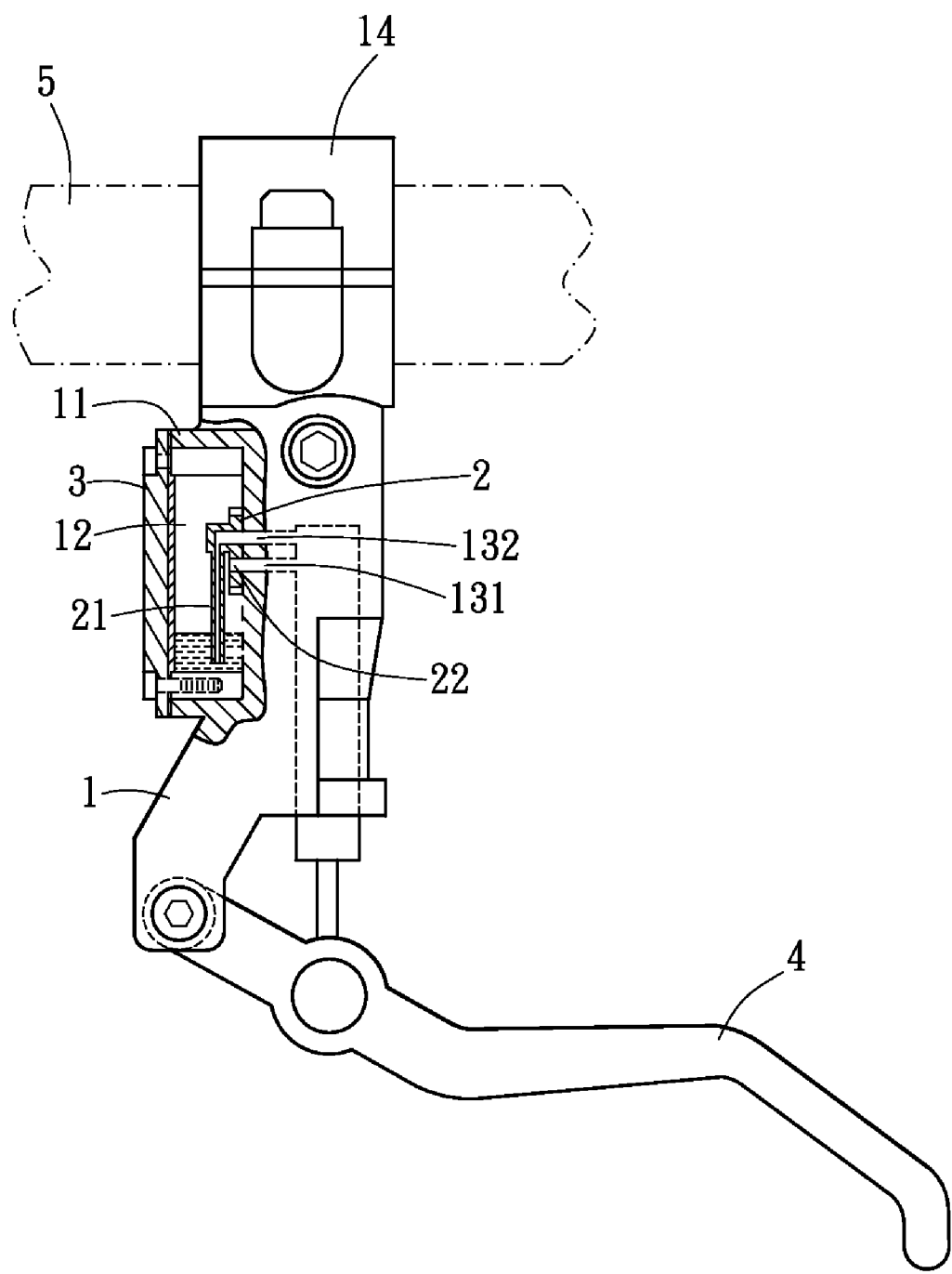
FIG. 3 is a side cross-sectional view of the oil guiding device for hydraulic brake lever assembly having a brake lever in accordance with the present invention.
Figure 4:
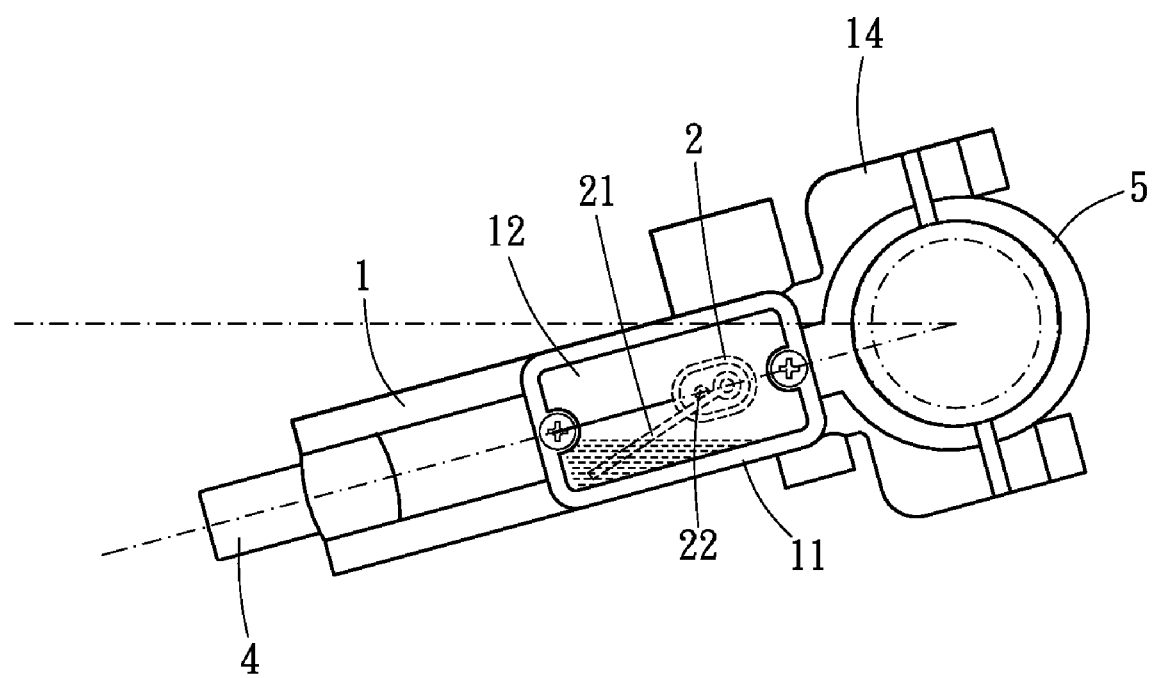
FIG. 4 is a top cross-sectional view of the oil guiding device for hydraulic brake lever assembly having a brake lever in accordance with the present invention.

Further referring to FIGS. 3-4, a position of the brake lever 4 relative to the bicycle handlebar 5 is adjustable via the connecting portion 14. The brake lever 4 is usually downwardly and inclinedly positioned relative to the bicycle handlebar 5 such that the brake lever 4 is in an ergonomically favorable position for gripping. As shown in FIG. 4, when the seat 1 and the brake lever 4 are downwardly inclinedly positioned relative to the bicycle handlebar 5, the hydraulic oil contained in the oil chamber 12 flows toward and gathered in a lower lateral end thereof which is proximate to the brake lever 4 due to gravity. Therefore, the pipe 21 with its tip oriented toward the brake lever 4 is able to solely and fully suck up the hydraulic oil gathered in the lower end of the oil chamber 12 and directly supplies the hydraulic oil for braking through the oil outlet 132 such that no air passes through the oil outlet 132 or enters into the hydraulic oil during operation (operations of a hydraulic brake lever is well-known, therefore further description of how the hydraulic brake lever operates will not be described herein). The returned hydraulic oil flows into the oil chamber 12 through the oil inlet 131 and the oil hole 22. By applying the oil guiding unit 2, air is prevented from entering into the hydraulic oil, therefore formation of air bubbles in the hydraulic oil and "spongy brake" operation are prevented, such that smooth braking operation is effectively maintained, and a usage life of the hydraulic brake lever assembly having a brake lever in accordance with the present invention is prolonged.

Although the invention has been explained in relations to its preferred embodiment, it is to be understood that many other possible modifications and variations can be made without departing from the spirit and scope of the invention as hereinafter claimed.

What is claimed is:

1. An oil guiding device for hydraulic brake lever assembly having a brake lever comprising:

a seat pivotally connected to the brake lever, the seat having an oil reservoir disposed thereon, the oil reservoir having an oil chamber defined therein adapted for storing hydraulic oil, an oil guiding base disposed in a bottom of the oil chamber, the oil guiding base having an oil inlet and an oil outlet defined therein;

an oil guiding unit engaged with the oil guiding base, the oil guiding unit having a pipe disposed thereon and radially extending therethrough such that the pipe is oriented toward the brake lever, the oil guiding unit having an oil hole defined therein and located adjacent to the pipe; the pipe and the oil hole correspondingly and respectively communicated with the oil outlet and the oil inlet; and a cover panel engaging with the oil reservoir for sealing the oil chamber;

wherein when the seat is downwardly inclinedly positioned relative to a bicycle handlebar, the hydraulic oil contained in the oil chamber gathered in a lower end thereof which is proximate to the brake lever, the pipe oriented toward the brake lever sucks up the hydraulic oil gathered in the lower end of the oil chamber and directly supplies the hydraulic oil for braking through the oil outlet such that no air enters into the oil outlet during operation; the returned hydraulic oil flows into the oil chamber through the oil inlet and the oil hole; thereby smooth braking operation is maintained as air is prevented from entering into the hydraulic oil during operation.

2. The oil guiding device for hydraulic brake lever assembly having a brake lever as claimed in claim 1, wherein the oil reservoir having a sealing pad coveringly disposed on an outer periphery thereof; the cover panel secured the sealing pad with the oil reservoir such that the sealing pad is sandwiched between the oil reservoir and the cover panel for preventing leakage of hydraulic oil from the oil chamber.

* * * * *